United States Patent
Doraiswamy et al.

(10) Patent No.: US 9,774,682 B2
(45) Date of Patent: Sep. 26, 2017

(54) PARALLEL DATA STREAMING BETWEEN CLOUD-BASED APPLICATIONS AND MASSIVELY PARALLEL SYSTEMS

(71) Applicant: International Business Machines Corporation, Armonk, NY (US)

(72) Inventors: Sangeeta T. Doraiswamy, San Jose, CA (US); Marc Hörsken, Mannheim (DE); Fatma Ozcan, San Jose, CA (US); Mir H. Pirahesh, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 197 days.

(21) Appl. No.: 14/591,951

(22) Filed: Jan. 8, 2015

(65) Prior Publication Data
US 2016/0205188 A1    Jul. 14, 2016

(51) Int. Cl.
*H04L 29/08* (2006.01)
*H04L 12/879* (2013.01)
*H04W 12/06* (2009.01)

(52) U.S. Cl.
CPC ........ *H04L 67/1097* (2013.01); *H04L 49/901* (2013.01); *H04L 67/10* (2013.01); *H04W 12/06* (2013.01)

(58) Field of Classification Search
CPC .......................... H04L 67/1097; H04L 49/901
USPC ....................................................... 709/205
See application file for complete search history.

(56) References Cited

U.S. PATENT DOCUMENTS

| | | | |
|---|---|---|---|
| 5,692,174 A * | 11/1997 | Bireley | G06F 17/30445 |
| 6,383,108 B1 | 5/2002 | Yoo | |
| 6,390,487 B1 | 5/2002 | Yoo | |
| 6,539,435 B2 * | 3/2003 | Bolmarcich | G06F 9/546 |
| | | | 718/107 |
| 8,069,190 B2 | 11/2011 | McColl et al. | |

(Continued)

FOREIGN PATENT DOCUMENTS

| CN | 1291153 A | 4/2001 |
|---|---|---|
| CN | 2716129 Y | 8/2005 |

(Continued)

OTHER PUBLICATIONS

Aly et al., "M3: Stream Processing on Main-Memory MapReduce", 2012 IEEE 28th International Conference on Data Engineering; pp. 1253-1256.

(Continued)

*Primary Examiner* — Suraj Joshi
(74) *Attorney, Agent, or Firm* — Cantor Colburn LLP; Bryan W Butler

(57) ABSTRACT

Embodiments relate to parallel data streaming between a first computer system and a second computer system. Aspects include transmitting a request to establish an authenticated connection between a processing job on the first computer system and a process on the second computer system and transmitting a query to the process on the second computer system over the authenticated connection. Aspects further include creating one or more tasks on the first computer system configured to receive data from the second computer system in parallel and reading data received by the one or more tasks by the processing job on the first computer system.

15 Claims, 6 Drawing Sheets

(56) References Cited

U.S. PATENT DOCUMENTS

| | | | |
|---|---|---|---|
| 8,181,168 B1* | 5/2012 | Lee | G06F 8/445 717/149 |
| 8,298,112 B2 | 10/2012 | Takada | |
| 2010/0034617 A1 | 2/2010 | Liao | |
| 2011/0154339 A1 | 6/2011 | Lee et al. | |
| 2011/0213802 A1 | 9/2011 | Singh et al. | |
| 2012/0185913 A1* | 7/2012 | Martinez | G06F 9/455 726/1 |
| 2012/0233668 A1 | 9/2012 | Leafe et al. | |
| 2012/0311581 A1 | 12/2012 | Balmin et al. | |

FOREIGN PATENT DOCUMENTS

| | | |
|---|---|---|
| CN | 202125527 U | 1/2012 |
| CN | 102401028 A | 4/2012 |
| CN | 102465974 A | 5/2012 |
| EP | 2354595 A2 | 8/2011 |
| EP | 2444312 A1 | 4/2012 |
| JP | H04321850 A | 11/1992 |
| JP | H07301291 A | 11/1995 |
| JP | 2007255604 A | 10/2007 |
| JP | 2008275150 A | 11/2008 |
| JP | 2011520070 A | 7/2011 |
| JP | 2011169375 A | 9/2011 |
| KR | 100641651 B1 | 10/2006 |
| KR | 20050132839 B1 | 10/2006 |
| KR | 20100112974 | 10/2010 |
| KR | 101088799 B1 | 12/2011 |
| KR | 20120017807 A | 2/2012 |
| KR | 101190755 B1 | 10/2012 |
| KR | 20120129172 A | 11/2012 |
| KR | 20130007211 A | 1/2013 |

OTHER PUBLICATIONS

Lohrmann, et al., "Processing Smart Meter Data Streams in the Cloud", 2011 2nd IEEE PES International Conference and Exhibition on Innovative Smart Grid Technologies (ISGT Europe), pp. 1-8, IEEE, 2011.

CN App. No. 201380029496.9; First Office Action; Date Mailed: Apr. 8, 2013, 7 pages.

Hamrock, et al.,"Rolling-Element Bearings" NASA Reference Publication, Jun. 1983, p. 1-63.

International Search Report; International Application No. PCT/KR2013006079; International Filing Date: Jan. 6, 2006; Date of Mailing: Jul. 31, 2013; 4 Pages.

Notification of Transmittal of the International Search Report and the Written Opinion of the International Searching Authority, or the Declaration, issued in International Application No. PCT/EP2016/050016, mailed Mar. 11, 2016; 11 pages.

* cited by examiner

US 9,774,682 B2

PARALLEL DATA STREAMING BETWEEN CLOUD-BASED APPLICATIONS AND MASSIVELY PARALLEL SYSTEMS

BACKGROUND

Embodiments of the invention relate generally to sharing data amongst disparate computer systems, and more specifically, to parallel data streaming between cloud-based applications and massively parallel systems.

Often, cloud computing environments located on private networks on disparate computer systems need to collaborate and require data-sharing with strict data visibility criteria enforced. Likewise, applications running on cloud computing environments may also require similar data-sharing capabilities with data residing in massively parallel computing systems. In general, if these systems are share nothing systems they cannot share data with disparate computer systems by storing files containing the data to be shared in a publicly accessible location due to security risks.

BRIEF SUMMARY

Embodiments include a method, system, and computer program product for parallel data streaming between a first computer system and a second computer system. The method includes transmitting a request to establish an authenticated connection between a processing job on the first computer system and a process on the second computer system and transmitting a query to the process on the second computer system over the authenticated connection. The method also includes creating one or more tasks on the first computer system configured to receive data from the second computer system in parallel and reading data received by the one or more tasks by the processing job on the first computer system.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Embodiments described herein are directed to methods, systems and computer program products for parallel data streaming between disparate computer systems, such as cloud-based applications and massively parallel systems. In exemplary embodiments, applications, or processing jobs, on a first computer system that is part of a private cloud computing system are able collaborate with a second computer system that is part of a remote cloud computing system. In exemplary embodiments, the second computer system requires data sharing capabilities with strict data access control and governs the data that it is willing to share by using credential information, certifications, entitlement rules, and data passed in from the first computer system to determine if the requested data that can be shared with the requesting user on the first computer system.

In exemplary embodiments, the disparate computer systems, which may include both cloud-based applications and massively parallel systems, utilize data sharing protocols to facilitate a secure parallel data exchange. In exemplary embodiments, the data sharing protocols employ a socket-based scheme and parallel threads to allow the disparate computer systems to directly and securely exchange data that a user is authorized and entitled to view. In exemplary embodiments, the data communication may be over TCP/IP sockets or any other suitable network protocols, such as RDMA. In general, socket communications are not secure by default; rather they need be supported with other methods, such as authentication, certification and the like for security.

Figure 1:
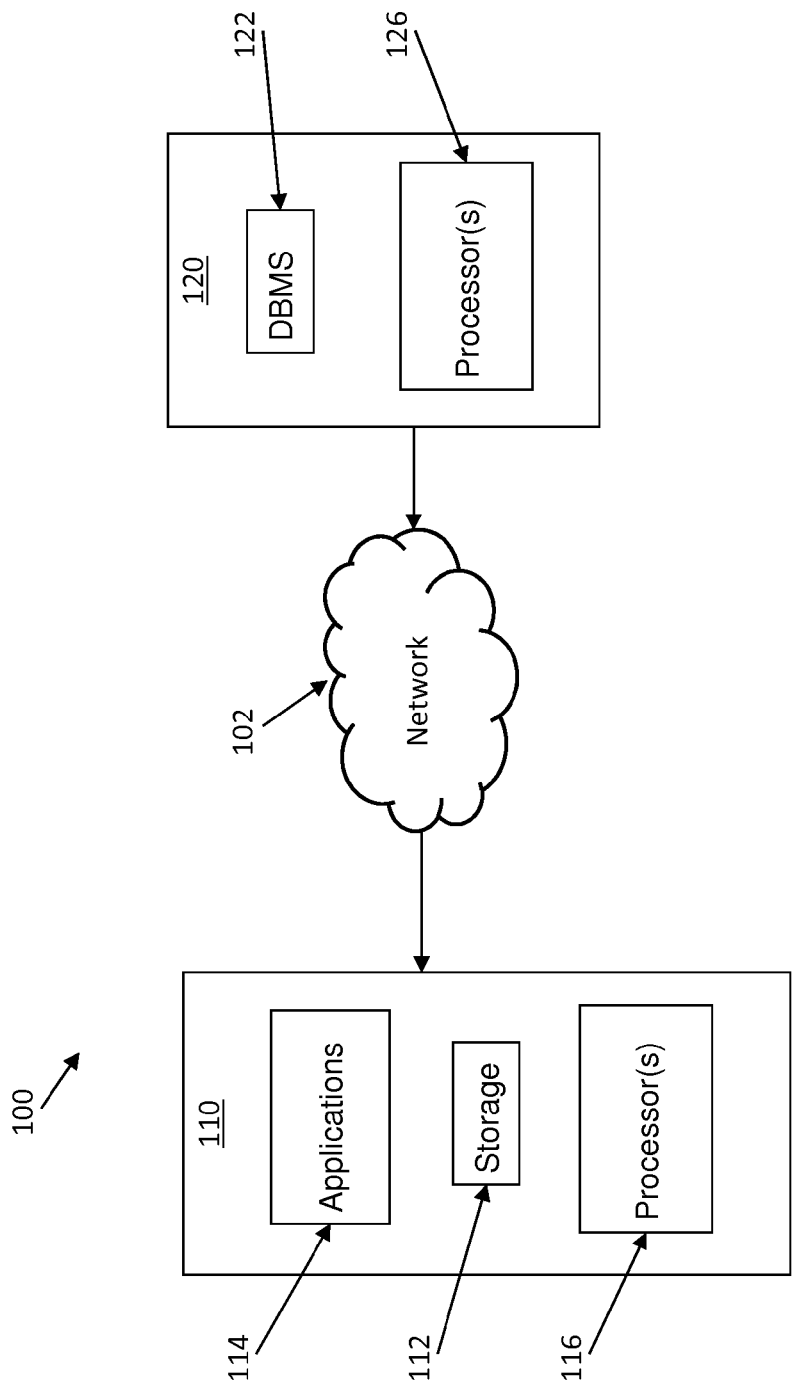
FIG. 1 depicts a block diagram of a system for parallel data streaming between computer systems in accordance with an embodiment.

Referring now to FIG. 1, a block diagram of a system 100 for parallel data streaming between computer systems in accordance with an embodiment is shown. As illustrated, the system 100 includes a first computer system 110 and a second computer system 120 which are in communication over a network 102. In exemplary embodiments, the first computer system 110 and the second computer system 120 may be either cloud or enterprise systems, such as a massively parallel processing system. Socket-based communication mechanisms are available on both the first computer system 110 and the second computer system 120 to enable parallel streaming of data between the two computer systems over the network 102. In exemplary embodiments, the first computer system 110 and the second computer system 120 respectively include processor 116 and processor 126, which can be used to support encryption and decryption of data exchanged over the network 102.

The second computer system 120 is separate from the first computer system and both of the computer systems are share nothing systems, that is they do not share access to any common data storage facility. In addition, at least one of the two computer systems does not permit storing intermediate results on a disk as they pose a security risk and may also have strict policies on data sharing, authentication and entitlement. In exemplary embodiments, either the first computer system 110 and the second computer system 120, or both, may be distributed processing systems, such as Hadoop-based systems.

In one embodiment, an application 114, such as a database query, that requires access to data from "views" (i.e. computation of intermediate results versus just the raw data from each source) over multiple sources, including both the first computer system 110 and the second computer system 120 for the purpose of analytics is being executed on the first computer system 110. As a result, the application 114 on the first computer system 110 requires computations to be performed on data stored on the second computer system 120.

In one embodiment, the first computer system 110 is a multi-node Hadoop and the second computer system 120 that includes a parallel database management system (DBMS) 122, such as DB2 with a Data Partitioning Feature (DPF). In one embodiment, operational data required by an application 114 may be contained in storage 112 of the first computer system 110 and transactional data required by an application 114 may be contained in the DMBS 122 of the second computer system 120. For example, an application 114 on the first computer system 110 may perform order fulfillment process for a retailer. In this case, the application 114 needs access to both order data stored in the storage 112 of the first computer system 110 and to customer data that is stored in the DMBS 122 residing on the second computer system 120. Current systems address this problem by pulling all of the data required for the computation (i.e. order and customer data) from the second computer system 120 to the first computer system 110. In other words, current systems load the whole data set onto the Hadoop system using off-line methods, as opposed to retrieving only the required data for each query during query execution. However, this approach can be prohibitively expensive for large datasets.

Figure 2:
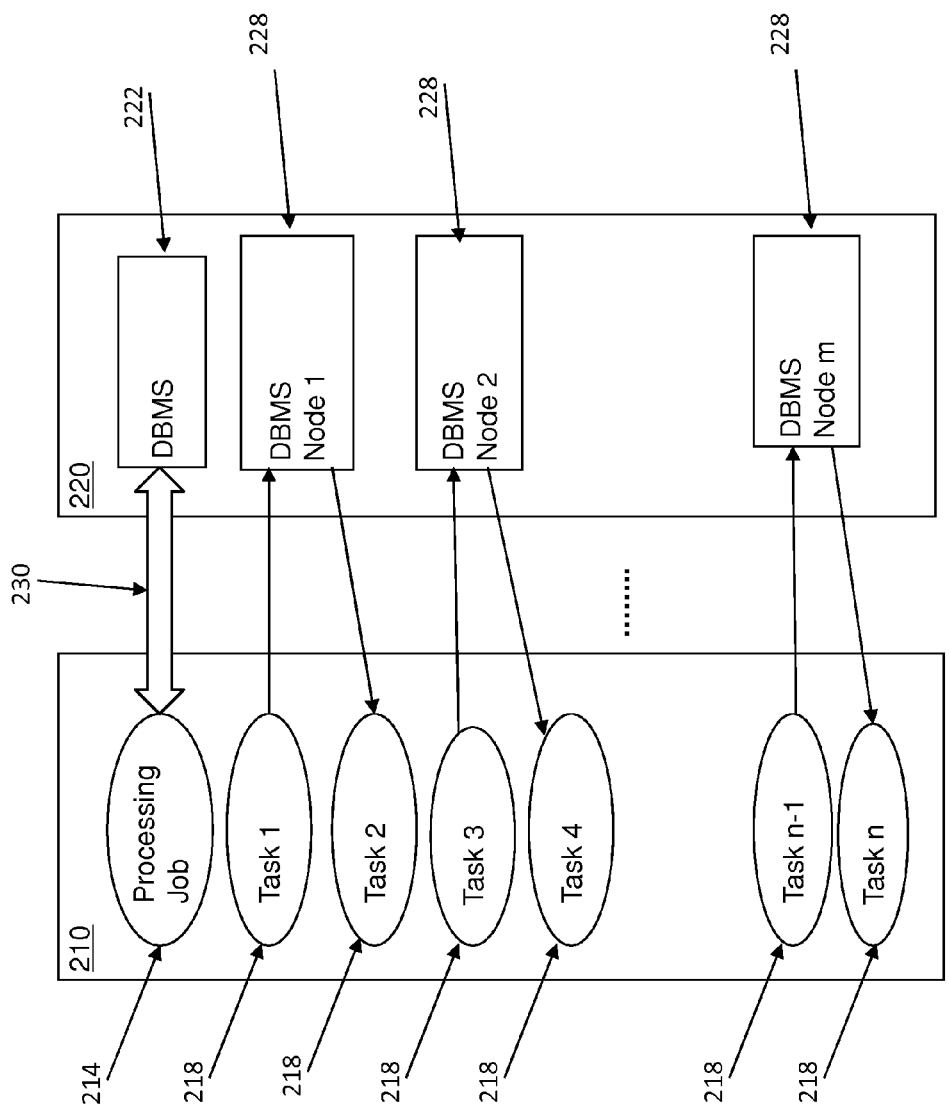
FIG. 2 depicts a process flow for uni-directional parallel data streaming between cloud-based applications and massively parallel systems in accordance with an embodiment.

Referring now to FIG. 2, a block diagram illustrating a uni-directional parallel streaming interface between a first computer system 210 and a second computer system 220 is shown. As illustrated, "m" DBMS instances 228 executing a query in parallel DBMS 222 on second computer system 220 return results in parallel to "n" tasks 218 executing on first computer system 210 (n≥m). In exemplary embodiments, the underlying multiplexing and connection sharing functionality supported in TCP/IP socket based communication mechanisms is exploited. In other embodiment, any other suitable socket based communication mechanisms may also be used to facilitate communication between the first computer system 210 and the second computer system 220.

In exemplary embodiments, a processing job 214 running on first computer system 210 asynchronously transmits a request 230 to a DBMS 222 running on second computer system 220. The request 230 transmitted by the first computer system 210 may include authentication and entitlement information so that the second computer system 220 can confirm that the first computer system 210 has sufficient access permissions to execute the request 230 on the DBMS 222. In exemplary embodiments, the request 230 contains a query to be executed on the DBMS 222 and a set of "m" port numbers to be used in transmitting the results of the query from the second computer system 220 to the first computer system 210.

After the second computer system 220 performs authentication and determines that the processing job 214 is entitled to view the requested data, the DBMS 222 on second computer system 220 executes multiple instances of the DMBS instance 228 in parallel on each of a plurality DMBS instances 228 of and the processing job 214 on first computer system 210 starts a plurality of "n" tasks 218, which setup "n" client side socket connections to the "m" ports. Each parallel DMBS instance 228 executes a portion the query in the DBMS 222 on second computer system 220 then picks one of the "m" ports and initializes the server end of a socket connection. On first computer system 210, "n" tasks 218 are initiated each of which picks one of the "m" ports and creates the client end of a socket connection to this port from which it will read results. Once a client-server socket connection has been established each parallel DMBS instance 228 can start writing results to a socket and the corresponding task 218 on the other end of the connection can begin to read from it. Since more than one task 218 can connect to a server socket on the DMBS instance 228, the DMBS instance 228 may need to write into multiple sockets. This can be achieved either by multi-core parallelism in the DMBS 222, or a single DMBS function or DMBS instance 228 writing into multiple sockets in a round-robin fashion. The appropriate task 218 on the first computer system 210 can then read the results.

In one embodiment, a mapping of n=m is used, i.e. a different port number is passed in for each DMBS instance 228. For example, if the first computer system 210 is configured with sixteen nodes, sixteen ports are passed to second computer system 220 from first computer system 210. The processing job 214 starts up sixteen tasks 218, or threads, and each DBMS instance 228 executing on second computer system 220 communicates over a socket connection established over the passed in port corresponding to one of the tasks 218.

Figure 3:
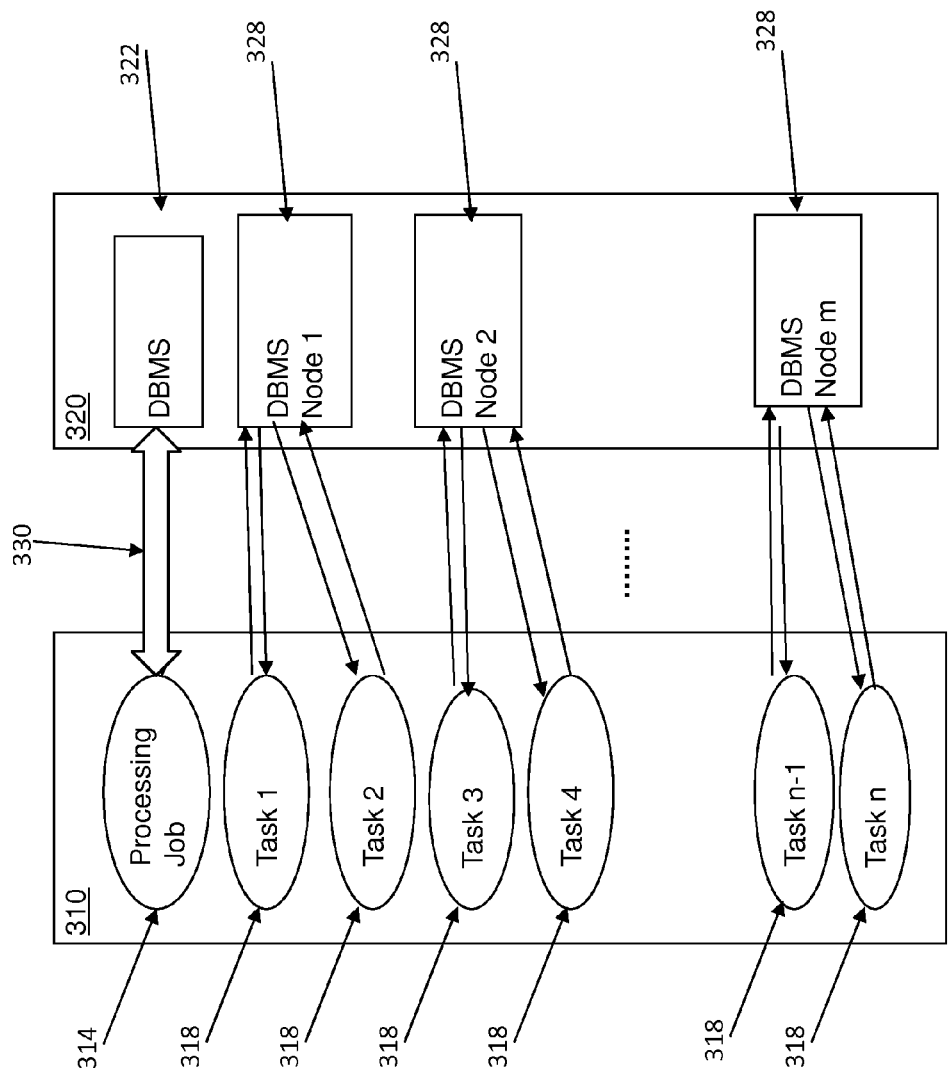
FIG. 3 depicts a process flow for bi-directional parallel data streaming between cloud-based applications and massively parallel systems in accordance with an embodiment.

Referring now to FIG. 3, a block diagram illustrating a bi-directional parallel streaming interface between a first computer system 310 and a second computer system 320 is shown. As illustrated, "m" DBMS instances executing a query 328 on a parallel DBMS 322 on second computer system 320 return results in parallel to "n" tasks 318 executing on first computer system 310 (n≥m). In exemplary embodiments, the second computer system 320 requires input data for its computations from first computer system 310. In some cases, the amount of required data is small, for example as is the case of a few customer-IDs and order numbers in the order fulfillment scenario. In such cases, the required data can be passed as function/query parameters alongside the function/query name to execute, as described in with reference to FIG. 2. In these cases, the parallel streaming interface is uni-directional, i.e. only results from the parallel DBMS query 328 need to be streamed back in parallel. However, in more complex join scenarios, a large amount of data may need to be sent to the second computer system 320 for processing. Using a uni-directional streaming interface for such complex join scenarios will cause all the data to be sent as a function/query parameter through a serial interface and will have a negative impact on the overall query performance. For these scenarios, a bi-directional parallel streaming interface is used when the second computer system 320 requires large amounts of input data for its computations from first computer system 310.

In exemplary embodiments, a processing job 314 on first computer system 310 requires results of a join over data in first computer system 310 and data residing in a parallel DBMS 322 on second computer system 320. The processing job 314 running on first computer system 310 transmits a request 330 to a DBMS 322 running on second computer system 320. In exemplary embodiments, the request 330 contains a query to be executed on the DBMS 322 and "n" ports, which are specifically designated as read ports over which second computer system 320 can read data from the first computer system 310 and "m" ports that are passed to write the results of the function/query request. Socket connections between the "n" tasks and the "m" parallel DBMS instances 328 for these read ports are established the same way as the write ports in the uni-directional streaming case. The "n" tasks 318 then send data required for the join from first computer system 310 over these socket connections to the "m" parallel DBMS instance 328 on second computer system 320. Multi-threading within the function/query is employed for the reads and writes over sockets to be processed separately, within each DBMS instance 328.

Figure 4:
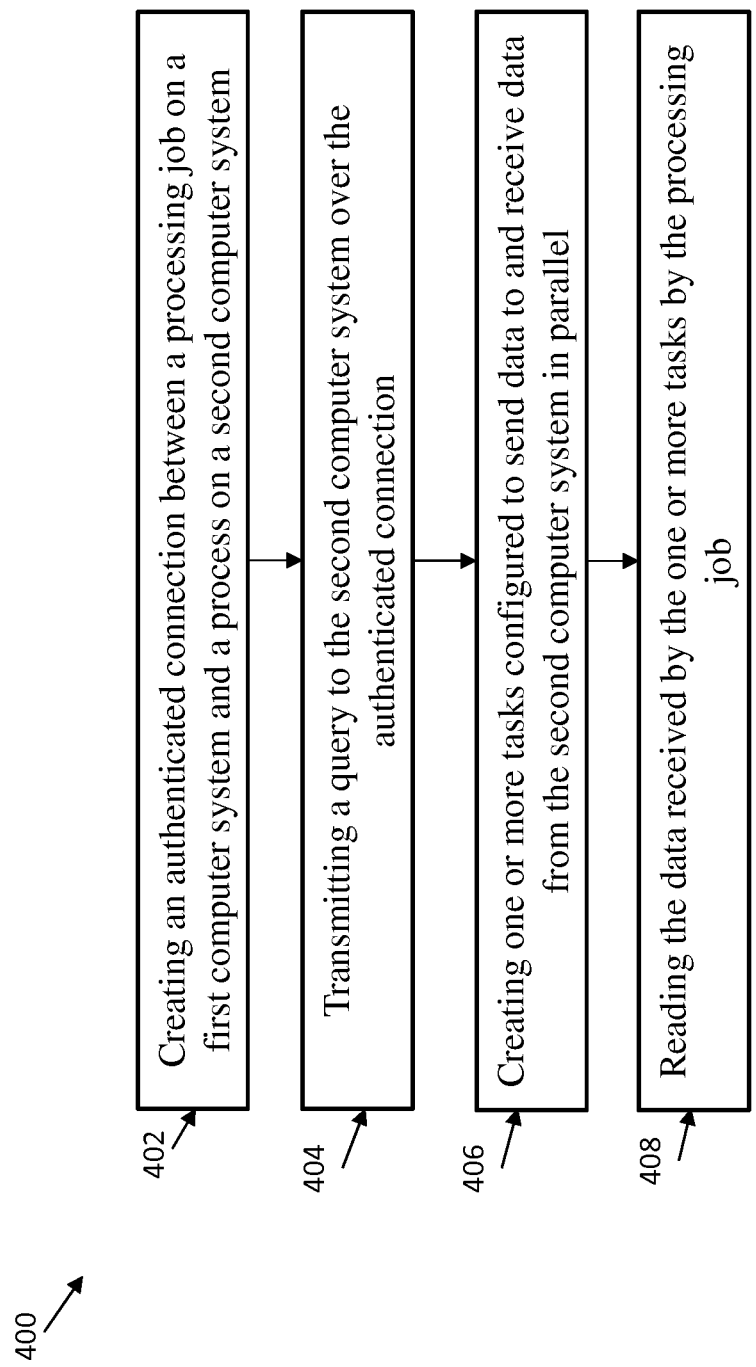
FIG. 4 depicts a flow diagram illustrating a method of parallel streaming between a first computer system and a second computer system in accordance with an embodiment.

Referring now to FIG. 4, a flow diagram illustrating a method 400 of parallel streaming between a first computer system and a second computer system is shown. As illustrated at block 402, the method 400 includes creating an authenticated connection between a processing job on a first computer system and a process on a second computer system. In exemplary embodiments, creating the authenticated connection may include transmitting credential information, user-data, entitlement rules and certification data between the two computer systems. Next, as shown at block 404, the method 400 includes transmitting a query to the second computer system over the authenticated connection. In exemplary embodiments, the query may include query information and communication information. In exemplary embodiments, the communication information may include a number of read and write ports for communication between the first computer system and the second computer system. Next, as shown at block 406, the method 400 includes creating one or more tasks configured to receive and send data from the second computer system in parallel. As shown at block 408, the processing job on the first computer system reads the data received by the one or more tasks.

Figure 5:
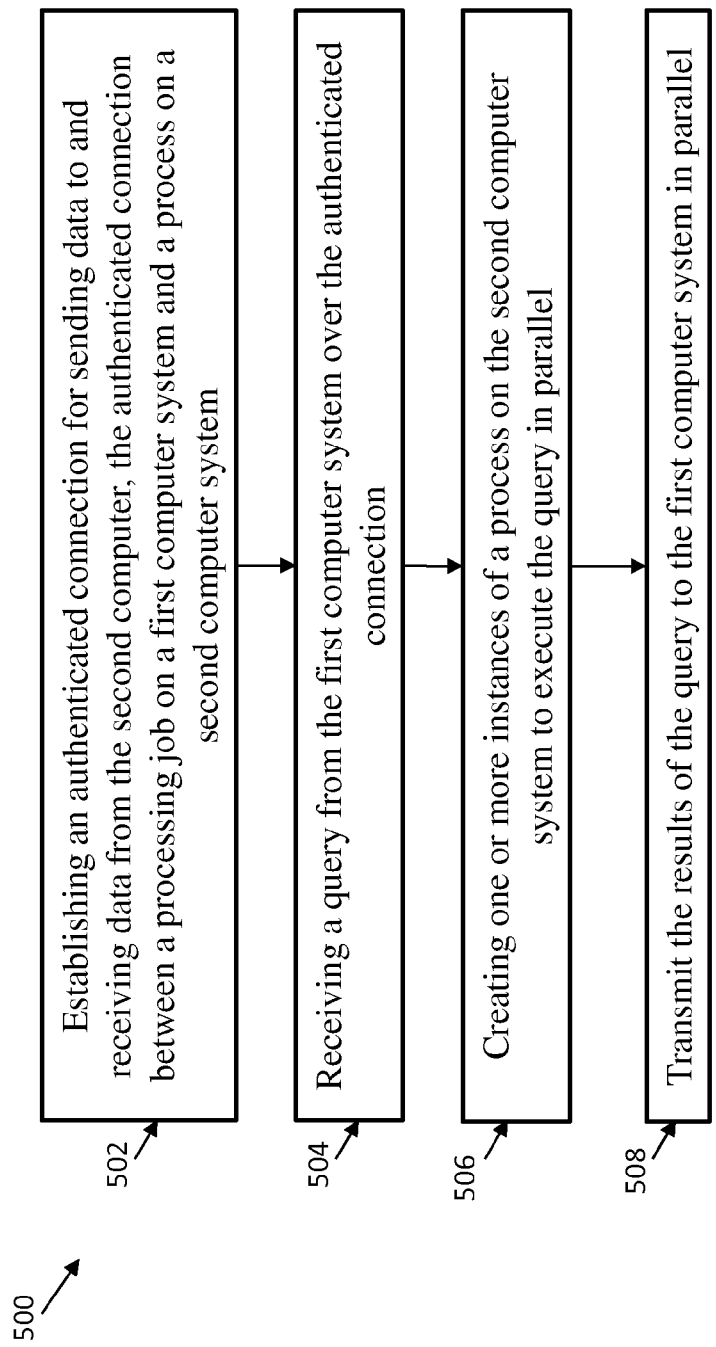
FIG. 5 depicts a flow diagram illustrating a method of parallel streaming between a first computer system and a second computer system in accordance with an embodiment.

Referring now to FIG. 5, a flow diagram illustrating a method 500 of parallel streaming between a first computer system and a second computer system is shown. As illustrated at block 502, the method 500 includes establishing an authenticated connection between a processing job on a first computer system and a process on a second computer system. In exemplary embodiments, establishing the authenticated connection may include receiving and validating credential information, user-data, entitlement rules and certification data from the first computer system. Next, as shown at block 504, the method 500 includes receiving a query from the first computer system over the authenticated connection. In exemplary embodiments, the query request includes query information and communication information that will be used by the second computer system to stream data to the first computer system. In exemplary embodiments, the communication information may include a number of read and write ports on the first computer system that can be accessed by the second computer system for transmitting and receiving data. Next, as shown at block 506, the method 500 includes creating one or more instances of a process on the second computer system to execute the query in parallel. As shown at block 508, the one or more instances of the process on the second computer system transmit the results of the query to the first computer system in parallel.

In exemplary embodiments, the communication information is used for establishing a socket-based communications between the first computer system and the second computer system. The communication information may be used by the second computer system to establish an n-to-m mapping of socket connections, which includes "n" processing tasks on the first computer system to read/write data in parallel from "m" instances of the function/query executing in parallel on the second computer system, where n≥m. The socket-based communications is used to stream encrypted results of the function/query executing on the second computer system to the first computer system.

Figure 6:
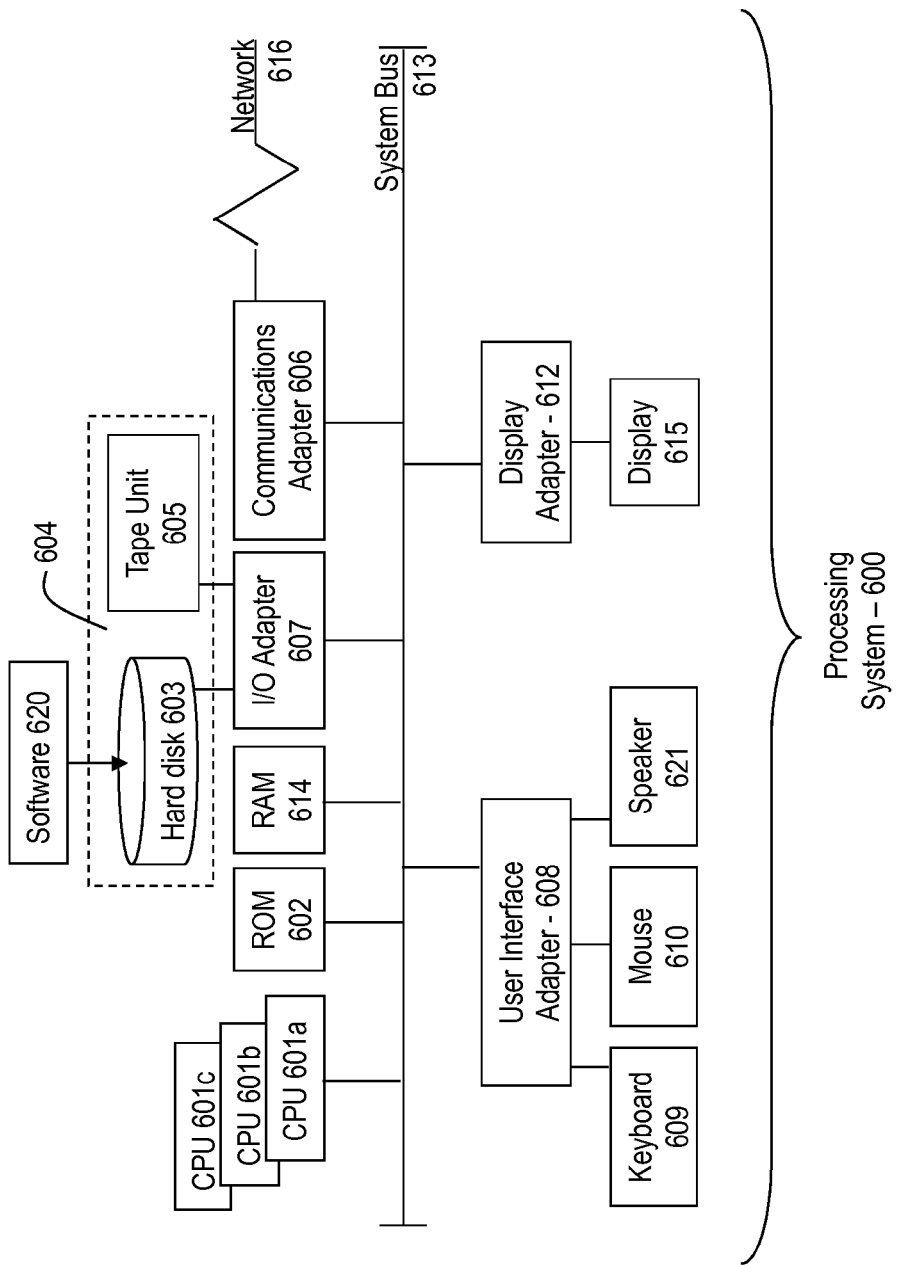
FIG. 6 depicts a processing system for practicing the teachings herein in accordance with an embodiment.

Referring to FIG. 6, there is shown an embodiment of a processing system 600 for implementing the teachings herein. In this embodiment, the system 600 has one or more central processing units (processors) 601*a*, 601*b*, 601*c*, etc. (collectively or generically referred to as processor(s) 601). In one embodiment, each processor 601 may include a reduced instruction set computer (RISC) microprocessor. Processors 601 are coupled to system memory 614 and various other components via a system bus 613. Read only memory (ROM) 602 is coupled to the system bus 613 and may include a basic input/output system (BIOS), which controls certain basic functions of system 600.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage device 605 are collectively referred to herein as mass storage 604. Software 620 for execution on the processing system 600 may be stored in mass storage 604. A network adapter 606 interconnects bus 613 with an outside network 616 enabling data processing system 600 to communicate with other such systems. A screen (e.g., a display monitor) 615 is connected to system bus 613 by display adaptor 612, which may include a graphics adapter to improve the performance of graphics intensive applications and a video controller. In one embodiment, adapters 607, 606, and 612 may be connected to one or more I/O busses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 160, and speaker 611 all interconnected to bus 613 via user interface adapter 608, which may include, for example, a Super I/O chip integrating multiple device adapters into a single integrated circuit.

Thus, as configured in FIG. 6, the system 600 includes processing capability in the form of processors 601, storage capability including system memory 614 and mass storage 604, input means such as keyboard 609 and mouse 160, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for parallel data streaming from a second computer system to a first computer system comprising:
   transmitting a request to the second computer system to establish an authenticated connection between a processing job on the first computer system and a process on the second computer system, wherein the request comprises a query to be executed on the second computing system and a set of m port numbers to be used to transmit results of the query from the second computer system to the first computer system;

creating n tasks on the first computer system configured to receive data from the second computer system in parallel, wherein the n tasks initiate n socket connections to the m port numbers, wherein each of the n tasks is associated with one of the m port numbers; and reading data received by the one or more tasks by the processing job on the first computer system.

2. The method of claim 1, wherein establishing the authenticated connection comprises exchanging credential information, user-data, entitlement rules and certification data between the first computer system and the second computer system.

3. The method of claim 1, wherein the m port numbers comprise read ports and write ports, wherein the write ports are used by the first computer system to write data to the second computer system and the read ports are used by the first computer system to read data from the second computer system.

4. The method of claim 1, wherein the first computer system and the second computer system are both share nothing systems.

5. The method of claim 1, wherein at least one of the first computer system and the second computer systems is a cloud computing system.

6. The method of claim 1, wherein at least one of the first computer system and the second computer systems is a massively parallel computing system.

7. A method of parallel data streaming from a second computer system to a first computer system comprising:

receiving a request from the first computer system to establish an authenticated connection between a processing job on the first computer system and a process on the second computer system, wherein the request comprises a query to be executed on the second computing system and a set of m port numbers to be used to transmit results of the query from the second computer system to the first computer system;

creating one or more instances of the process on the second computer system to execute the query in parallel;

execute the query in parallel on each of the one or more instance of the process to generate one or more sets of results; and transmitting the one or more sets of results of the query to n tasks of the first computer system in parallel over the m ports, wherein each of the n tasks is associated with one of the m port numbers.

8. The method of claim 7, wherein establishing the authenticated connection comprises exchanging credential information, user-data, entitlement rules and certification data between the first computer system and the second computer system.

9. The method of claim 7, wherein the m port numbers comprise read ports and write ports, wherein the write ports are used by the first computer system to write data to the second computer system and the read ports are used by the first computer system to read data from the second computer system.

10. The method of claim 7, wherein the first computer system and the second computer system are both share nothing systems.

11. The method of claim 7, wherein at least one of the first computer system and the second computer systems is a cloud computing system.

12. The method of claim 7, wherein at least one of the first computer system and the second computer systems is a massively parallel computing system.

13. A computer program product for parallel streaming from a first computer system to a second computer system, the computer program product comprising a non-transitory computer readable storage medium having program code embodied therewith, the program code executable by a processor to:

transmitting a request to the second computer system to establish an authenticated connection between a processing job on the first computer system and a process on the second computer system, wherein the request comprises a query to be executed on the second computing system and a set of m port numbers to be used to transmit results of the query from the second computer system to the first computer system;

creating n tasks on the first computer system configured to receive data from the second computer system in parallel, wherein the n tasks initiate n socket connections to the m port numbers, wherein each of the n tasks is associated with one of the m port numbers; and reading data received by the one or more tasks by the processing job on the first computer system.

14. The computer program product of claim 13, wherein establishing the authenticated connection comprises exchanging credential information, user-data, entitlement rules and certification data between the first computer system and the second computer system.

15. The computer program product of claim 13, wherein the m port numbers comprise read ports and write ports, wherein the write ports are used by the first computer system to write data to the second computer system and the read ports are used by the first computer system to read data from the second computer system.

* * * * *